United States Patent
Min et al.

(10) Patent No.: US 11,611,074 B2
(45) Date of Patent: Mar. 21, 2023

(54) CATHODE ACTIVE MATERIAL FOR LITHIUM SECONDARY BATTERY, METHOD FOR MANUFACTURING SAME, AND LITHIUM SECONDARY BATTERY COMPRISING SAME

(71) Applicants: POSCO HOLDINGS INC., Seoul (KR); RESEARCH INSTITUTE OF INDUSTRIAL SCIENCE & TECHNOLOGY, Pohang-si (KR); POSCO CHEMICAL CO., LTD., Pohang-si (KR)

(72) Inventors: Sung Hwan Min, Gumi-si (KR); Jeong Han Kim, Gumi-si (KR); Jung Hoon Song, Seoul (KR)

(73) Assignees: POSCO HOLDINGS INC., Seoul (KR); RESEARCH INSTITUTE OF INDUSTRIAL SCIENCE & TECHNOLOGY, Pohang-si (KR); POSCO CHEMICAL CO., LTD., Pohang-si (KR)

( * ) Notice: Subject to any disclaimer, the term of this patent is extended or adjusted under 35 U.S.C. 154(b) by 282 days.

(21) Appl. No.: 16/958,231

(22) PCT Filed: Dec. 18, 2018

(86) PCT No.: PCT/KR2018/016147
§ 371 (c)(1),
(2) Date: Jun. 26, 2020

(87) PCT Pub. No.: WO2019/132381
PCT Pub. Date: Jul. 4, 2019

(65) Prior Publication Data
US 2020/0388839 A1 Dec. 10, 2020

(30) Foreign Application Priority Data
Dec. 26, 2017 (KR) ........................ 10-2017-0179893

(51) Int. Cl.
*H01M 4/48* (2010.01)
*H01M 4/04* (2006.01)
(Continued)

(52) U.S. Cl.
CPC ........... *H01M 4/48* (2013.01); *H01M 4/0471* (2013.01); *H01M 4/131* (2013.01);
(Continued)

(58) Field of Classification Search
None
See application file for complete search history.

(56) References Cited

U.S. PATENT DOCUMENTS

2011/0123865 A1* 5/2011 Kepler ................. H01M 4/366
429/223
2015/0030928 A1* 1/2015 Kwak ................... H01M 4/505
264/618

(Continued)

FOREIGN PATENT DOCUMENTS

CN 102167718 A 8/2011
CN 104507865 A 4/2015
(Continued)

OTHER PUBLICATIONS

Japanese Office Action dated Jun. 29, 2021 issued in Japanese Patent Application No. 2020-535240.
(Continued)

*Primary Examiner* — Carlos Barcena
(74) *Attorney, Agent, or Firm* — Morgan, Lewis & Bockius LLP

(57) ABSTRACT

The present invention relates to a positive active material for lithium secondary battery, its manufacturing method, and lithium secondary battery including the same, and it provides that a positive active material for lithium secondary battery, comprising: a core and a coating layer, wherein, the
(Continued)

core is lithium metal oxide, the coating layer comprises boron, the boron compound in the coating layer comprises a lithium boron oxide and a boron oxide, the lithium boron oxide is included 70 wt % or more and 99 wt % in the entire coating layer, the lithium boron oxide comprises $Li_2B_4O_7$, with respect to the lithium boron oxide 100 wt %, the content of $Li_2B_4O_7$ is 55 wt % or more and 99 wt % or less.

10 Claims, 3 Drawing Sheets

(51) Int. Cl.
  *H01M 4/131* (2010.01)
  *H01M 4/1391* (2010.01)
  *H01M 10/0525* (2010.01)
  *H01M 4/02* (2006.01)

(52) U.S. Cl.
  CPC ..... *H01M 4/1391* (2013.01); *H01M 10/0525* (2013.01); *H01M 2004/027* (2013.01); *H01M 2004/028* (2013.01)

(56) References Cited

U.S. PATENT DOCUMENTS

| | | | |
|---|---|---|---|
| 2016/0013476 A1 | 1/2016 | Oh et al. | |
| 2017/0299221 A1 | 8/2017 | Park et al. | |

FOREIGN PATENT DOCUMENTS

| | | | |
|---|---|---|---|
| CN | 104781960 A | 7/2015 | |
| CN | 106575764 A | 4/2017 | |
| EP | 2741354 B1 | 11/2016 | |
| EP | 3678219 A1 | 7/2020 | |
| JP | 2012-28313 A | 2/2012 | |
| JP | WO2013/021955 A1 | 3/2015 | |
| JP | 2015-088343 A | 5/2015 | |
| JP | 2015-133318 A | 7/2015 | |
| JP | 2015-536558 A | 12/2015 | |
| JP | 2018-500720 A | 1/2018 | |
| JP | 2020-0536352 A | 12/2020 | |
| KR | 10-2001-0036766 A | 5/2001 | |
| KR | 10-2014-0051926 A | 5/2014 | |
| KR | 10-2014-0081663 A | 7/2014 | |
| KR | 10-2015-0013077 A | 2/2015 | |
| KR | 10-2015-0050458 A | 5/2015 | |
| KR | 10-2015-0074744 A | 7/2015 | |
| KR | 10-2017-0076088 A | 7/2017 | |
| WO | 2017/164650 A1 | 9/2017 | |

OTHER PUBLICATIONS

International Search Report and Written Opinion issued in corresponding International Application No. PCT/KR2018/016147 dated Apr. 5, 2019, with English translation.
Extended European Search Report issued in corresponding European Patent Application No. 18897184.0 dated Jan. 18, 2021.
Chan et al. "Valence change by in situ XAS in surface modified . . . " Electrochemistry Communications, Elsevier Amsterdam, NL, vol. 8, No. 11, Sep. 6, 2006, pp. 1731-1736, XP028041710.
Chan et al. "Electrochemical performance of LBO-coated spinel . . . " Surface and Coatings Technology, Elsevier, Amsterdam, NL, vol. 188-189, Sep. 11, 2004, pp. 116-119, XP027184803.

* cited by examiner

[FIG. 1]
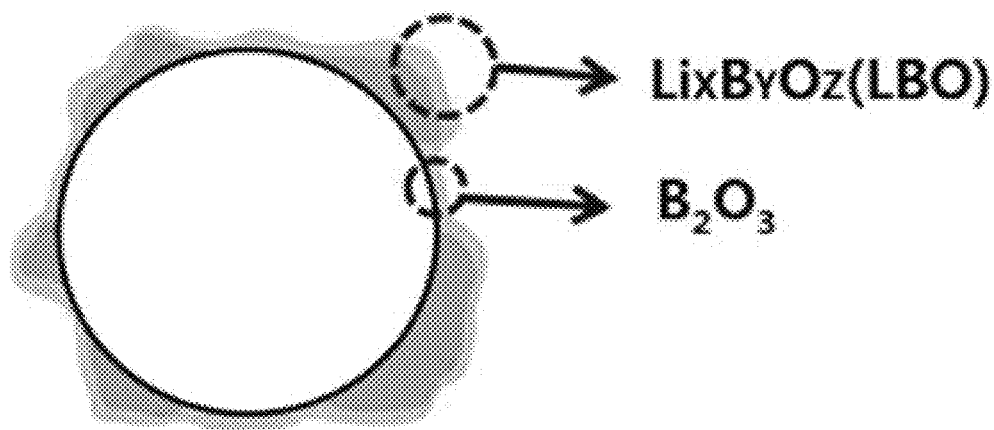

[FIG. 2]
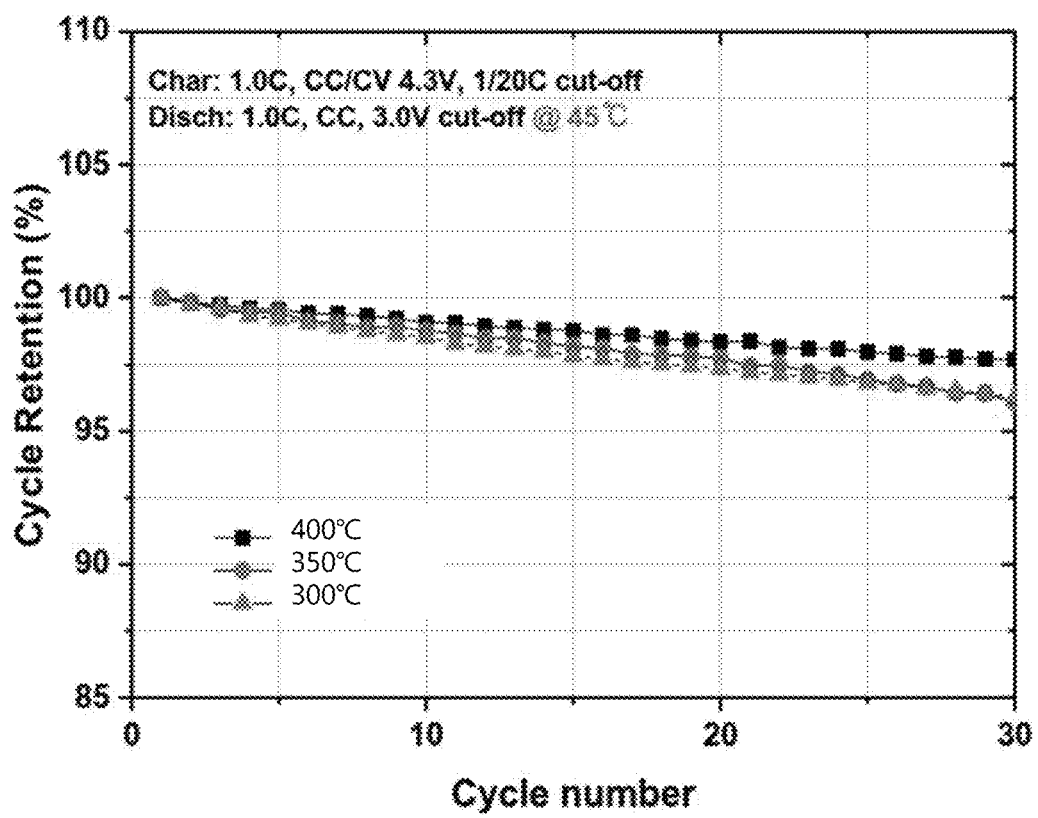

[FIG. 3]
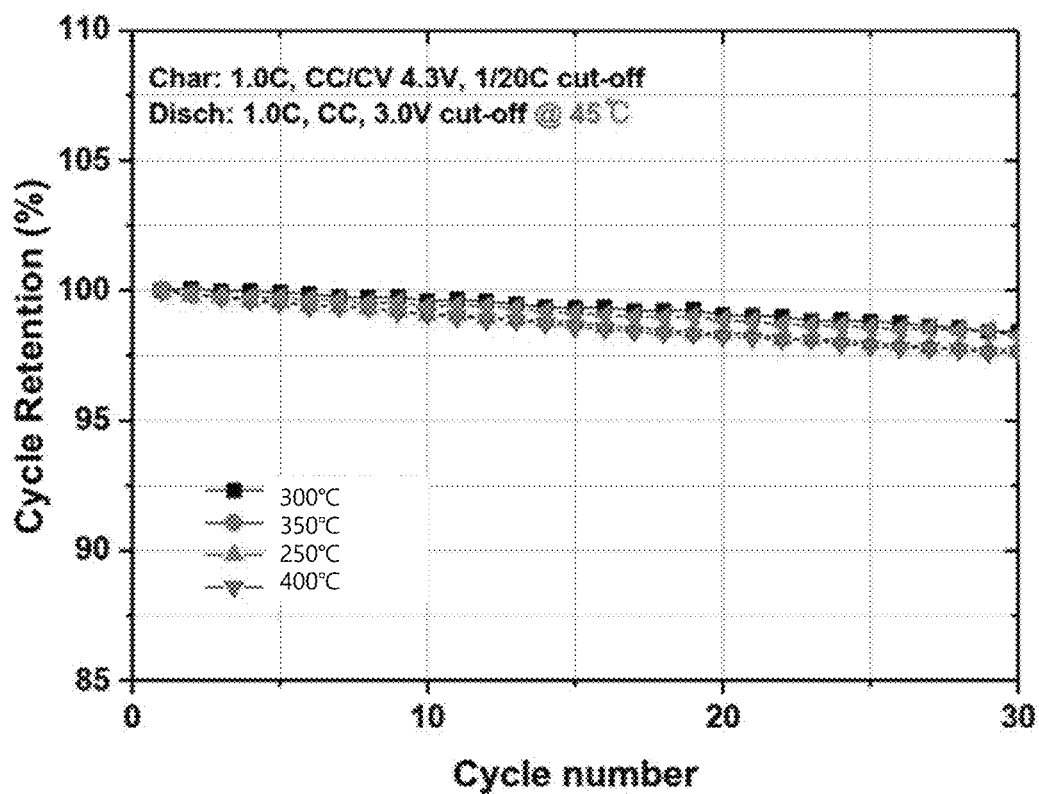

CATHODE ACTIVE MATERIAL FOR LITHIUM SECONDARY BATTERY, METHOD FOR MANUFACTURING SAME, AND LITHIUM SECONDARY BATTERY COMPRISING SAME

CROSS REFERENCE

This application is the U.S. National Phase under 35 U.S.C. § 371 of International Application No. PCT/KR2018/016147 filed on Dec. 18, 2018, which claims the benefit of Korean Application No. 10-2017-0179893 filed on Dec. 26, 2017, the entire contents of each are hereby incorporated by reference.

TECHNICAL FIELD

It relates to a positive active material for a lithium secondary battery, its manufacturing method, and a lithium secondary battery comprising the same. More specifically, it is for a positive active material in which the amount of lithium boron oxide and boron oxide generated during boron coating is controlled.

BACKGROUND

With the recent trend of downsizing and weight reduction of portable electronic devices, there is an increasing need for high performance and large capacity of batteries used as power sources for these devices.

The battery generates electricity by using a material capable of electrochemical reaction on the positive electrode and the negative electrode. A typical example of such a battery is a lithium secondary battery that generates electrical energy by changing the chemical potential when lithium ions are intercalated/deintercalated at the positive and negative electrodes.

The lithium secondary battery is manufactured by using a material capable of reversible intercalation/deintercalation of lithium ions as a positive and a negative active material, and charging an electrolyte between the positive and the negative electrode.

Lithium composite metal compounds are used as positive active materials for lithium secondary batteries, for example, complex metal oxides such as $LiCoO_2$, $LiMn_2O_4$, $LiNiO_2$, $LiNi_{1-x}Co_xO_2$ (0<x<1), and $LiMnO_2$ are being researched.

Among them, lithium nickel-based oxide is cheaper than cobalt-based oxide. In addition, as it shows a high discharge capacity when charged to 4.3 V, the reversible capacity of doped lithium nickel-based oxide approaches about 200 mAh/g, which exceeds the capacity of $LiCoO_2$ (about 165 mAh/g). Therefore, lithium nickel-based positive active materials are commercially available for high-capacity cells by having an improved energy density despite a slightly lower discharge voltage and volumetric density.

However, a major problem with lithium nickel-based positive active materials is the presence of lithium impurities such as $Li_2CO_3$ and LiOH that remain on the surface during synthesis. Lithium impurities remaining on the surface react with $CO_2$ or $H_2O$ in the air to form $Li_2CO_3$. $Li_2CO_3$ can cause an initial non-reversible capacity and problems such as interfering with the movement of lithium ions on the surface. In addition, it is also the main cause of gas generation by decomposition reaction during electrochemical reaction.

Accordingly, a research is needed to secure structural stability of nickel-based positive active materials and suppress side reactions on surfaces.

DISCLOSURE

Problem to Solve

It is to provide an improved characteristic positive active material for a lithium secondary battery, its manufacturing method, and a lithium secondary battery comprising the same. More specifically, it is possible to provide a positive active material in which the amount of lithium boron oxide and boron oxide generated during boron coating is controlled.

Solution to Problem

In one embodiment of the present invention, it provides that a positive active material for lithium secondary battery, comprising: a core and a coating layer, wherein, the core is lithium metal oxide, the coating layer comprises boron, the boron compound in the coating layer comprises a lithium boron oxide and a boron oxide, the lithium boron oxide is included 70 wt % or more and 99 wt % in the entire coating layer, the lithium boron oxide comprises $Li_2B_4O_7$, with respect to the lithium boron oxide 100 wt %, the content of $Li_2B_4O_7$ is 55 wt % or more and 99 wt % or less.

The lithium boron oxide can further comprise $Li_3BO_3$.

With respect to the lithium boron oxide 100 wt %, the content of $B_2O_3$ may be 20 wt % or less.

With respect to the the lithium boron oxide 100 wt %, the content of $Li_3BO_3$ may be 1 wt % or less.

In other embodiment of the present invention, it provides that a method of manufacturing a positive active material for lithium secondary battery, comprising: preparing a metal hydroxide precursor; obtaining a lithium metal oxide by mixing and sintering the metal hydroxide precursor and a lithium raw material; washing the lithium metal oxide; and obtaining a positive active material by mixing and heat treating the washed lithium metal oxide and a coating material;

wherein, the coating material comprises boron, the obtained positive active material comprises a core and a coating layer, wherein the core is lithium metal oxide, the boron compound in the coating layer comprises a lithium boron oxide and a boron oxide, the lithium boron oxide is included 70 wt % or more and 99 wt % in the entire coating layer, the lithium boron oxide comprises $Li_2B_4O_7$, and with respect to the lithium boron oxide 100 wt %, the content of $Li_2B_4O_7$ is 55 wt % or more and 99 wt % or less.

In the step of obtaining a positive active material by mixing and heat treating the washed lithium metal oxide and a coating material; residual lithium of the washed lithium metal oxide is 2,000 to 3,000 ppm, and a sintering temperature is above 350° C. and below 450° C.

In the step of obtaining a lithium metal oxide by mixing and sintering the metal hydroxide precursor and a lithium raw material; the lithium raw material is LiOH.

In the step of obtaining a positive active material by mixing and heat treating the washed lithium metal oxide and a coating material; a residual lithium of the washed lithium metal oxide is 1,000 to 2,000 ppm, and a sintering temperature is above 250° C. and below 350° C.

In the step of obtaining a lithium metal oxide by mixing and sintering the metal hydroxide precursor and a lithium raw material; the lithium raw material is $Li_2CO_3$.

In other embodiment of the present invention, it provides that a lithium secondary battery, comprising: a positive electrode containing positive active material according to the one embodiment of the present invention; a negative electrode, and an electrolyte positioned between the positive and negative electrode.

Other specific details of the embodiments of the present invention are included in the following detailed description.

Effect

A lithium secondary battery including a positive active material according to an embodiment of the present invention may have improved capacity, high rate discharge effect, cycle-life characteristic, C-rate characteristic, and the like.

BRIEF DESCRIPTION OF DRAWINGS

FIG. 1 is a schematic reaction formula for boron coating.
FIG. 2 is coin cell data according to an exemplary embodiment of the present invention.
FIG. 3 is coin cell data according to an exemplary embodiment of the present invention.

DESCRIPTION

Hereinafter, an implementation example of the present invention will be described in detail. However, this is presented as an example, whereby the present invention is not limited, and the present invention is only defined by the scope of the claims to be described later.

Positive Active Material

In one embodiment of the present invention, it provides that a positive active material for lithium secondary battery, comprising: a core and a coating layer, wherein, the core is lithium metal oxide, the coating layer comprises boron, the boron compound in the coating layer comprises a lithium boron oxide and a boron oxide, the lithium boron oxide is included 70 wt % or more and 99 wt % in the entire coating layer, the lithium boron oxide comprises $Li_2B_4O_7$, with respect to the lithium boron oxide 100 wt %, the content of $Li_2B_4O_7$ is 55 wt % or more and 99 wt % or less.

More specifically, when boron coating, it may be a positive active material that controls the ratio of lithium boron oxide and boron oxide; and the content of two types of lithium boron oxide.

From the proposal of this range, it is possible to control an appropriate range of effects such as electric conductivity and side reaction suppression with electrolyte solution.

For a specific example, $B_2O_3$ may play a positive role such as high temperature cycle-life and high temperature storage by side reaction suppression with electrolyte solution, but also plays a negative role of increasing the cell resistance by deteriorating electric conductivity.

Accordingly, the present inventors have found the most optimal coating material range by appropriately controlling the content of lithium boron oxide and boron oxide.

The specific reaction formula of lithium boron oxide and boron oxide is as follows.

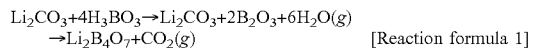
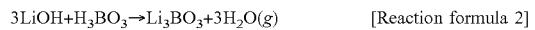

[Reaction formula 1]

$3LiOH+H_3BO_3 \rightarrow Li_3BO_3+3H_2O(g)$ [Reaction formula 2]

The raw material for boron coating (e.g., $H_3BO_3$) and the lithium raw material are reacted to form lithium boron oxide. If it is not in contact with the lithium raw material, $B_2O_3$ may be generated. FIG. 1 schematically shows the boron oxide generation portion of a spherical positive active material.

A detailed method for controlling more specifically will be described.

Manufacturing Method of Positive Active Material for Lithium Secondary Battery

In other embodiment of the present invention, it provides that a method of manufacturing a positive active material for lithium secondary battery, comprising: preparing a metal hydroxide precursor; obtaining a lithium metal oxide by mixing and sintering the metal hydroxide precursor and a lithium raw material; washing the lithium metal oxide; and obtaining a positive active material by mixing and heat treating the washed lithium metal oxide and a coating material.

Accordingly, a detailed description of the positive active material prepared is as described above.

Specifically, a positive active material was prepared through the following method.

To prepare the metal oxide precursor, the raw materials $NiSO_4*6H_2O$, $CoSO_4*7H_2O$, and $MnSO_4*H_2O$ are weighed and dissolved in distilled water. The dissolved metal hydrate solution is precipitated by reacting with ammonia and sodium hydroxide in the reactor. The precipitated slurry was washed with water, separated as solid/liquid using a filter press, and then the residual moisture was removed using high pressure fresh air.

The solid-liquid separated precursor was dried at 100 to 200° C. using fluid bed dryer. After the dried precursor is mixed with LiOH or $Li_2CO_3$, 4.0 kg of the mixed precursor is filled into a saggar wich is mullite material, and sintered in an air atmosphere in a furnace at a temperature of 700 to 900° C. and heating rate of 1.0 to 4.0/min.

Subsequently, a final positive active material can be obtained by mixing with boron raw material $H_3BO_3$ and heat treatment.

For a specific example, the lithium raw material may be LiOH. In this case, according to the reaction equations 1 and 2, both $Li_2B_4O_7$ and $Li_3BO_3$ compounds can be generated.

In the step of obtaining a positive active material by mixing and heat treating the washed lithium metal oxide and a coating material; residual lithium of the washed lithium metal oxide is 2,000 to 3,000 ppm, and a sintering temperature is above 350° C. and below 450° C.

At this time, the specific temperature conditions are greater than 350° C. and less than 450° C., and the compound changes in the coating layer are shown in Table 1 below.

TABLE 1

| Small particles, ppm | | LixByOz(LBO) | $Li_2CO_3$ | LiOH |
|---|---|---|---|---|
| Wash and dry | | — | 2,661 | 1,129 |
| Heat Temp. | 300 | 1,389 | 2,424 | 1,082 |
| | 350 | 1,201 | 2,365 | 1,197 |
| | 400 | 1,197 | 2,110 | 2,012 |
| | 450 | 1,015 | 2,561 | 2,745 |

Considering the reaction equation, it can be seen that Boron reacted with $Li_2CO_3$ at heat treatment temperature 400° C. was about 309 ppm, and the remaining 91 ppm was used to make $B_2O_3$.

Therefore, it is estimated that the coating product of the final material is "$Li_2B_4O_7$ (about 1,256 ppm)+$B_2O_3$ (about 293 ppm)".

For reference, the coating product of the final material at a heat treatment temperature of 350° C. is estimated to be "$Li_2B_4O_7$ (about 676 ppm)+$Li_3BO_3$ (about 524 ppm)+$B_2O_3$ (about 502 ppm)", and as the heat treatment temperature decreases, the ratio of $Li_3BO_3$ among LBO gradually increases, and the content of $B_2O_3$ increases simultaneously.

For reference, the coating product of the final material at a heat treatment temperature of 450° C. is estimated to be "$Li_2B_4O_7$ (about 225 ppm)+$Li_3BO_3$ (about 790 ppm)+$B_2O_3$ (about 759 ppm)". As the heat treatment temperature increases, the ratio of $Li_3BO_3$ among LBO gradually increases, and the content of $B_2O_3$ increases simultaneously.

TABLE 2

| heat treatment temperature | $Li_2B_4O_7$ | $Li_3BO_3$ | $B_2O_3$ |
|---|---|---|---|
| 350° C. | 676 ppm<br>40 wt % | 524 ppm<br>30 wt % | 502 ppm<br>30 wt % |
| 400° C. | 1256 ppm<br>81 wt % | | 293 ppm<br>19 wt % |
| 450° C. | 225 ppm<br>12.5 wt % | 790 ppm<br>44.5 wt % | 759 ppm<br>43 wt % |

FIG. 2 is an evaluation result of a coin cell manufactured using the above-mentioned active material using lithium raw material as LiOH. The manufacturing method of a specific coin cell is as follows.

The obtained positive active material, conductive material (Denka black), and binder (PVDF) were mixed uniformly in N-methyl-2pyrrolidone (NMP) solvent so that the mass ratio was 94:3:3. The mixture was evenly cast on an aluminum foil using a doctor blade. It was then vacuum-dryed in a 100 to 200 vacuum oven for 12 hours. Then, a positive electrode plate was manufactured by pressing in a roll press. Li-metal was used as a counter electrode. As an electrolyte solution, 1 mol of LiPF6 salt was dissolved in a mixed solvent of ethylene carbonate (EC):ethyl methyl carbonate (EMC)=1:2, and used as an electrolyte solution. Through this method, a conventional half coin cell was produced.

As can be seen from FIG. 2, it shows the best battery characteristic at 400° C. heat treatment temperature. This is consistent with the evaluation result of residual lithium.

For a specific example, the lithium raw material may be $Li_2CO_3$. In this case, according to the reaction formulas 1 and 2, $Li_2B_4O_7$ compound may be the majority.

In the step of obtaining a positive active material by mixing and heat treating the washed lithium metal oxide and a coating material; a residual lithium of the washed lithium metal oxide is 1,000 to 2,000 ppm, and a sintering temperature is above 250° C. and below 350° C.

For the description, refer to Table 3 below.

TABLE 3

| Small particles, ppm | | $Li_xB_yO_z$(LBO) | $Li_2CO_3$ | LiOH |
|---|---|---|---|---|
| Wash and dry | | — | 1,672 | 1,321 |
| Heat Temp. | 250 | 1,056 | 1,425 | 1,045 |
| | 300 | 1,253 | 1,191 | 946 |
| | 350 | 1,178 | 1,134 | 1,347 |
| | 400 | 1,207 | 1,094 | 2,335 |
| | 450 | 1,025 | 1,215 | 2,752 |

Considering the reaction equation, it can be seen that Boron reacted with $Li_2CO_3$ at a heat treatment temperature of 300° C. was about 314 ppm, and the remaining about 86 ppm was used to make $B_2O_3$.

Therefore, it is estimated that the coating product of the final material is "$Li_2B_4O_7$ (about 1,229 ppm)+$B_2O_3$ (about 291 ppm)".

For reference, at a heat treatment temperature of 250° C., the coating product of the final material is estimated to be "$Li_2B_4O_7$ (about 563 ppm)+$Li_3BO_3$ (about 493 ppm)+$B_2O_3$ (about 609 ppm)". As the heat treatment temperature is lowered, the ratio of $Li_3BO_3$ in LBO tends to increase gradually, and it can be seen that the content of $B_2O_3$ increases simultaneously.

For reference, at a heat treatment temperature of 400° C., the coating product of the final material is estimated to be "$Li_2B_4O_7$ (about 1,207 ppm)+$B_2O_3$ (about 296 ppm)", and it can be seen that the amount of LiOH gradually increases as the heat treatment temperature increases. (LiOH allowance at this time is limited to 2,000 ppm or less) For reference, at a heat treatment temperature of 450° C., the coating product of the final material is estimated to be "$Li_2B_4O_7$ (about 1,207 ppm)+$B_2O_3$ (about 296 ppm)". It can be seen that as the heat treatment temperature increases, the content of $B_2O_3$ increases and the amount of LiOH also increases.

TABLE 4

| heat treatment temperature | $Li_2B_4O_7$ | $Li_3BO_3$ | $B_2O_3$ |
|---|---|---|---|
| 250° C. | 563 ppm<br>34 wt % | 493 ppm<br>30 wt % | 609 ppm<br>36 wt % |
| 300° C. | 1229 ppm<br>80 wt % | | 291 ppm<br>20 wt % |
| 400° C. | 1207 ppm<br>80 wt % | | 296 ppm<br>20 wt % |
| 450° C. | 1207<br>80 wt % | | 296<br>20 wt % |

FIG. 3 is a coin cell evaluation result when lithium raw material is used as $Li_2CO_3$. The heat treatment temperature shows excellent cell characteristics around 300° C. This is consistent with the evaluation result of residual lithium.

Lithium Secondary Battery

In other embodiment of the present invention, it provides that a lithium secondary battery, comprising: a positive electrode containing positive active material according to the one embodiment of the present invention; a negative electrode, and an electrolyte positioned between the positive and negative electrode.

The positive electrode includes a current collector and a positive active material layer formed on the current collector.

Aluminum can be used as the current collector, but is not limited in addition.

The positive electrode active material layer also includes a binder and a conductive material.

The binder not only attaches the positive electrode active material particles to each other but also adheres the positive electrode active material to the current collector. For typical example, there may be polyvinyl alcohol, carboxymethyl cellulose, hydroxypropyl cellulose, diacetyl cellulose, polyvinyl chloride, carboxylated polyvinyl chloride, polyvinyl fluoride, a polymer including ethylene oxide, polyvinylpyrrolidone, polyurethane, polytetrafluoroethylene, polyvinylidene fluoride, polyethylene, polypropylene, styrene-butadiene rubber, acrylated styrene-butadiene rubber, epoxy resin, nylon, or the like, but is not limited thereto.

The conductive material is used to give conductivity to the electrode, and any material can be the conductive material as long as the material is an electronic conductive material and it does not trigger a chemical change in the battery configured according to the method. For example, a conductive material may include metal powders such as natural graphite, artificial graphite, carbon black, acetylene black, ketjen black, carbon fiber, copper, nickel, aluminum, silver, or the like; metal fibers; and the like. Moreover, a mixture of one or more conductive materials such as polyphenylene derivatives or the like may be used.

The negative electrode includes a current collector and a negative electrode active material layer formed on the current collector.

As the current collector, a copper foil, nickel foil, stainless steel foil, titanium foil, nickel foam, copper foam, a polymer substrate coated with a conductive metal, or combination thereof can be used.

The negative active material layer includes a negative active material, a binder composition, and/or conductive material.

The negative electrode active material includes materials capable of reversibly intercalating and deintercalating lithium ions, a lithium metal, lithium metal alloys, materials being capable of doping and dedoping lithium, and transition metal oxides.

Descriptions of the negative active material, binder composition, and conductive material are omitted.

The electrolyte contains non-aqueous organic solvent and lithium salt. The non-aqueous organic solvent and lithium salt may be applied without limitation as long as they are commercially available, so a detailed description thereof will be omitted.

The present invention is not limited to the exemplary embodiments, but may be manufactured in various different forms, and a person having ordinary knowledge in the technical field to which the present invention belongs may be different without changing the technical idea or essential characteristics of the present invention. It will be understood that it may be implemented in a specific form. Therefore, the exemplary embodiments described above are illustrative in all respects and should be understood as non-limiting.

The invention claimed is:

1. A positive active material for lithium secondary battery, comprising:
    a core and a coating layer,
    wherein, the core is lithium metal oxide,
    the coating layer comprises boron,
    a boron compound in the coating layer comprises a lithium boron oxide and a boron oxide,
    the lithium boron oxide is included 70 wt % or more and 99 wt % in the entire coating layer,
    the lithium boron oxide comprises $Li_2B_4O_7$,
    with respect to the lithium boron oxide 100 wt %, the content of $Li_2B_4O_7$ is 55 wt % or more and 99 wt % or less.

2. The positive active material of claim 1, wherein:
    the lithium boron oxide further comprises $Li_3BO_3$.

3. The positive active material of claim 1, wherein:
    with respect to the lithium boron oxide 100 wt %, the content of $B_2O_3$ is 20 wt % or less.

4. The positive active material of claim 1, wherein: with respect to the lithium boron oxide 100 wt %, the content of $Li_3BO_3$ is 1 wt % or less.

5. A lithium secondary battery, comprising:
    a positive electrode containing positive active material according to claim 1;
    a negative electrode, and
    an electrolyte positioned between the positive and negative electrode.

6. A method of manufacturing a positive active material for lithium secondary battery, comprising:
    preparing a metal hydroxide precursor;
    obtaining a lithium metal oxide by mixing and sintering the metal hydroxide precursor and a lithium raw material;
    washing the lithium metal oxide; and
    obtaining a positive active material by mixing and heat treating the washed lithium metal oxide and a coating material;
    wherein, the coating material comprises boron,
    the obtained positive active material comprises a core and a coating layer, wherein the core is lithium metal oxide,
    a boron compound in the coating layer comprises a lithium boron oxide and a boron oxide,
    the lithium boron oxide is included 70 wt % or more and 99 wt % in the entire coating layer,
    the lithium boron oxide comprises $Li_2B_4O_7$, and
    with respect to the lithium boron oxide 100 wt %, the content of $Li_2B_4O_7$ is 55 wt % or more and 99 wt % or less.

7. The method of claim 6, wherein:
    in the step of obtaining a positive active material by mixing and heat treating the washed lithium metal oxide and a coating material;
    a residual lithium of the washed lithium metal oxide is 2,000 to 3,000 ppm, and
    a sintering temperature is above 350° C. and below 450° C.

8. The method of claim 7, wherein:
    in the step of obtaining a lithium metal oxide by mixing and sintering the metal hydroxide precursor and a lithium raw material;
    the lithium raw material is LiOH.

9. The method of claim 6, wherein:
    in the step of obtaining a positive active material by mixing and heat treating the washed lithium metal oxide and a coating material;
    a residual lithium of the washed lithium metal oxide is 1,000 to 2,000 ppm, and
    a sintering temperature is above 250° C. and below 350° C.

10. The method of claim 9, wherein:
    in the step of obtaining a lithium metal oxide by mixing and sintering the metal hydroxide precursor and a lithium raw material;
    the lithium raw material is $Li_2CO_3$.

* * * * *